Figure 1:
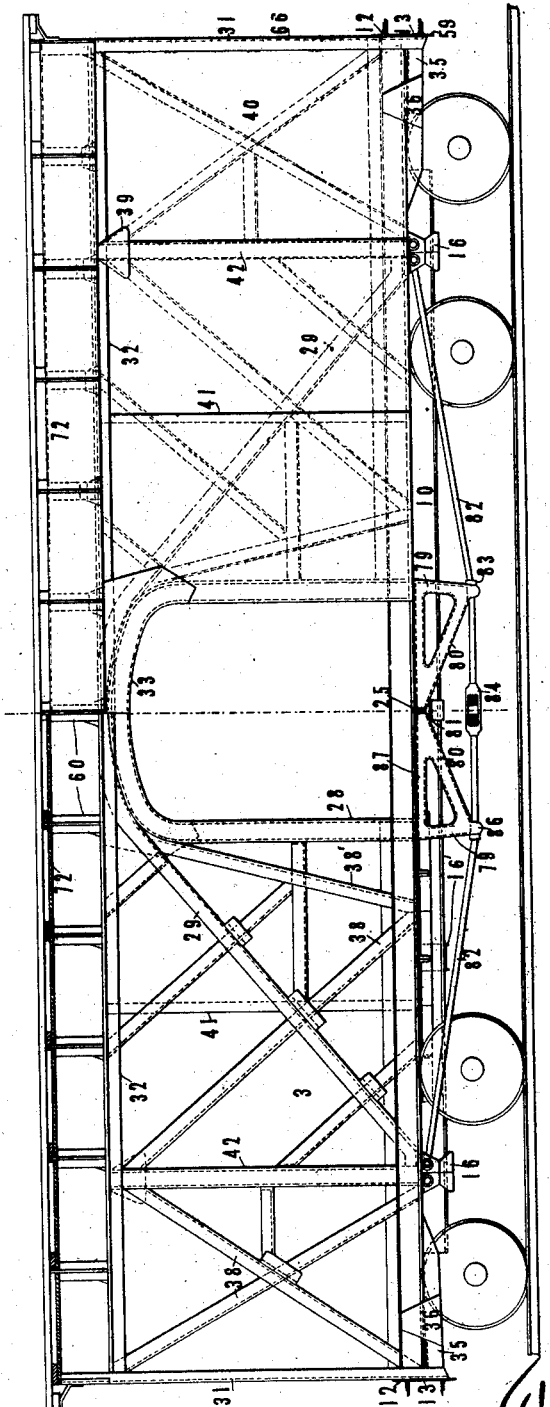

W. R. McKEEN, Jr.
CAR STRUCTURE.
APPLICATION FILED MAR. 9, 1907.

972,708.

Patented Oct. 11, 1910.
4 SHEETS—SHEET 1.

WITNESSES

INVENTOR
W. R. McKeen Jr.
BY
Duell, Warfield & Duell
ATTORNEYS.

THE NORRIS PETERS CO., WASHINGTON, D. C.

W. R. McKEEN, Jr.
CAR STRUCTURE.
APPLICATION FILED MAR. 9, 1907.
972,708.
Patented Oct. 11, 1910.
4 SHEETS—SHEET 2.
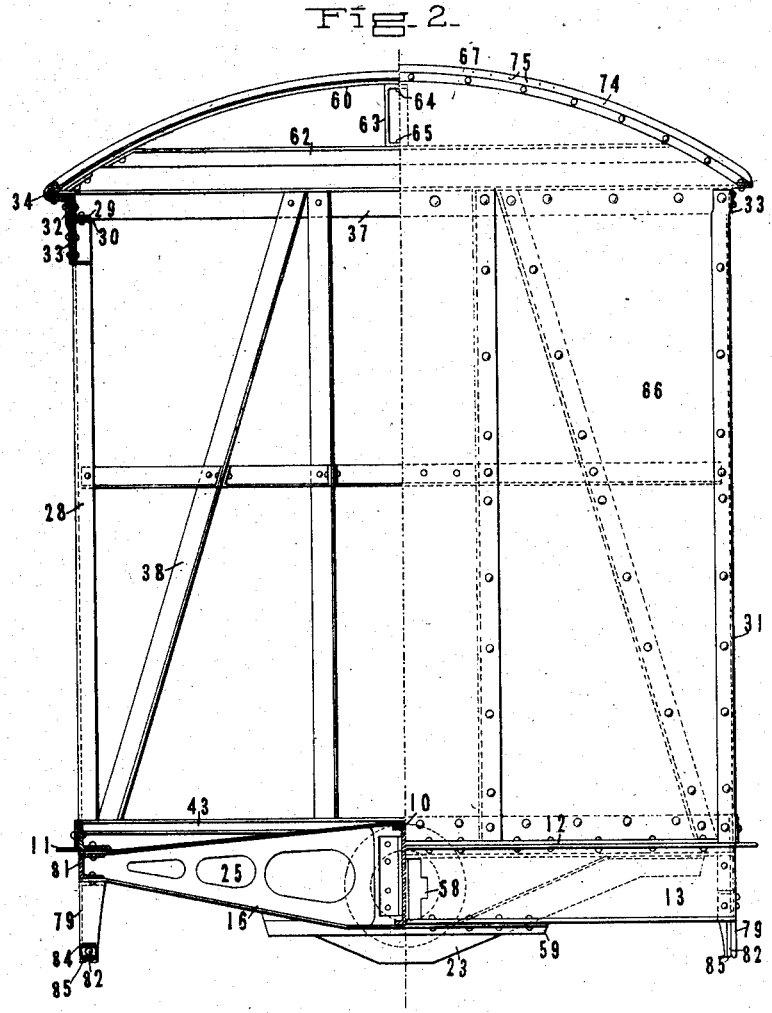
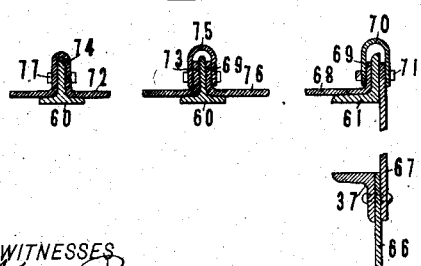
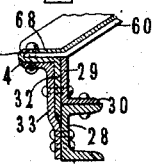
WITNESSES
INVENTOR
ATTORNEYS.

W. R. McKEEN, Jr.
CAR STRUCTURE.
APPLICATION FILED MAR. 9, 1907.

972,708.

Patented Oct. 11, 1910.
4 SHEETS—SHEET 3.

WITNESSES

INVENTOR
W. R. McKeen Jr.
BY
ATTORNEYS.

W. R. McKEEN, Jr.
CAR STRUCTURE.
APPLICATION FILED MAR. 9, 1907.
972,708.
Patented Oct. 11, 1910.
4 SHEETS—SHEET 4.
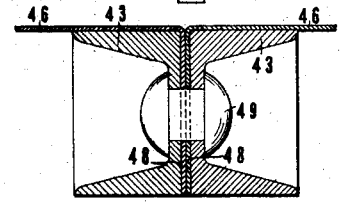
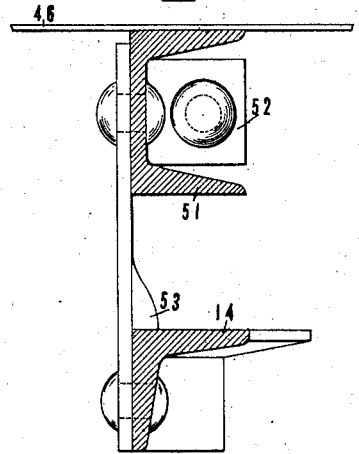
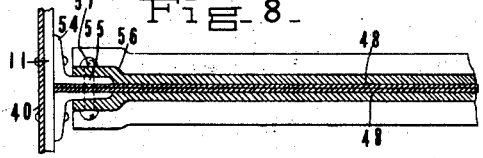
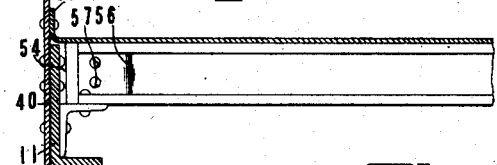
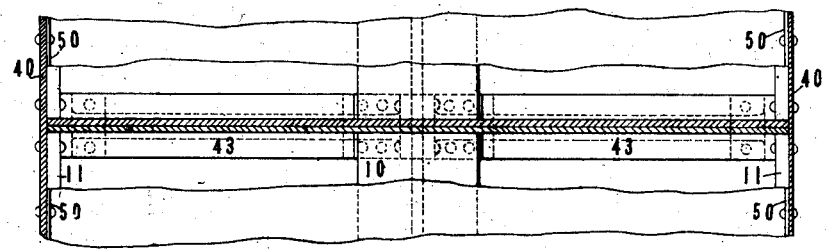
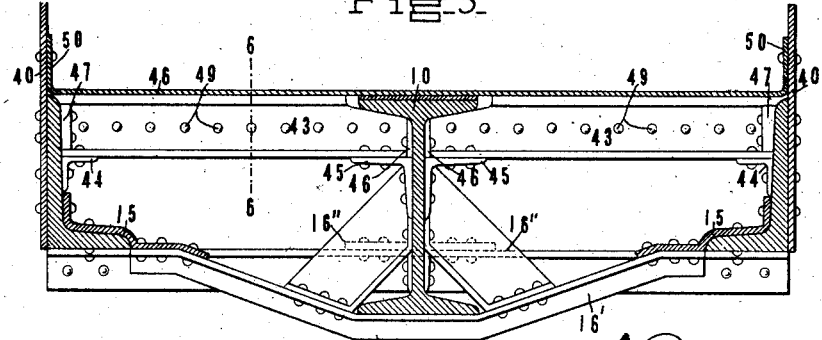
WITNESSES
INVENTOR
BY
ATTORNEYS.
THE NORRIS PETERS CO., WASHINGTON, D. C.

UNITED STATES PATENT OFFICE.

WILLIAM R. McKEEN, JR., OF OMAHA, NEBRASKA, ASSIGNOR TO McKEEN MOTOR CAR COMPANY, OF OMAHA, NEBRASKA, A CORPORATION OF NEW JERSEY.

CAR STRUCTURE.

972,708.  Specification of Letters Patent.  Patented Oct. 11, 1910.

Application filed March 9, 1907. Serial No. 361,597.

*To all whom it may concern:*

Be it known that I, WILLIAM R. McKEEN, Jr., residing at Omaha, in the county of Douglas and State of Nebraska, have invented certain new and useful Improvements in Car Structures, of which the following is a full, clear, and exact description, such as will enable others skilled in the art to which it appertains to make and use the same.

This invention relates to car structures, and has for an object to provide a car structure composed principally of metal parts embodying new and improved features of strength, economy, and rigidity.

A further object of the invention is to provide in a car structure a doorway of large dimensions and so arranged and reinforced as to give ample and sufficient strength for carrying at its center when necessary the greater part of the full capacity of the loaded car.

A further object of the invention is to provide in a car structure improved means for supporting the central portions of the structures by means of truss-rods, associated body-bolsters, needle-beams, truss-rod stands or queen-posts, and other parts of improved form.

A further object of the invention is to provide in a car structure improved means for applying and using a metal floor to be free from the obstruction of rivet or bolt heads on its inside loading surface.

A further object of the invention is to provide a car structure embodying a single center supporting beam and with improved means for applying a draft rigging to the beam and with improved means of bracing and stiffening said beam and of joining or connecting said beam to side sill beams.

A further object of the invention is to provide in a car structure improved means of applying the roof in order that the same will brace and strengthen the sides of car and that the metal sheets will be free from vertical rivets or bolts to prevent the possibility of leakage.

A further object of the invention is to provide in a car structure improved means for transmitting the central load of the car to the bolsters through truss-rods and arched queen-posts at the side center of the car.

With these and other objects in view the invention comprises certain other novel constructions, combinations, and arrangements of parts, as will be hereinafter fully described and claimed.

Figure 3:
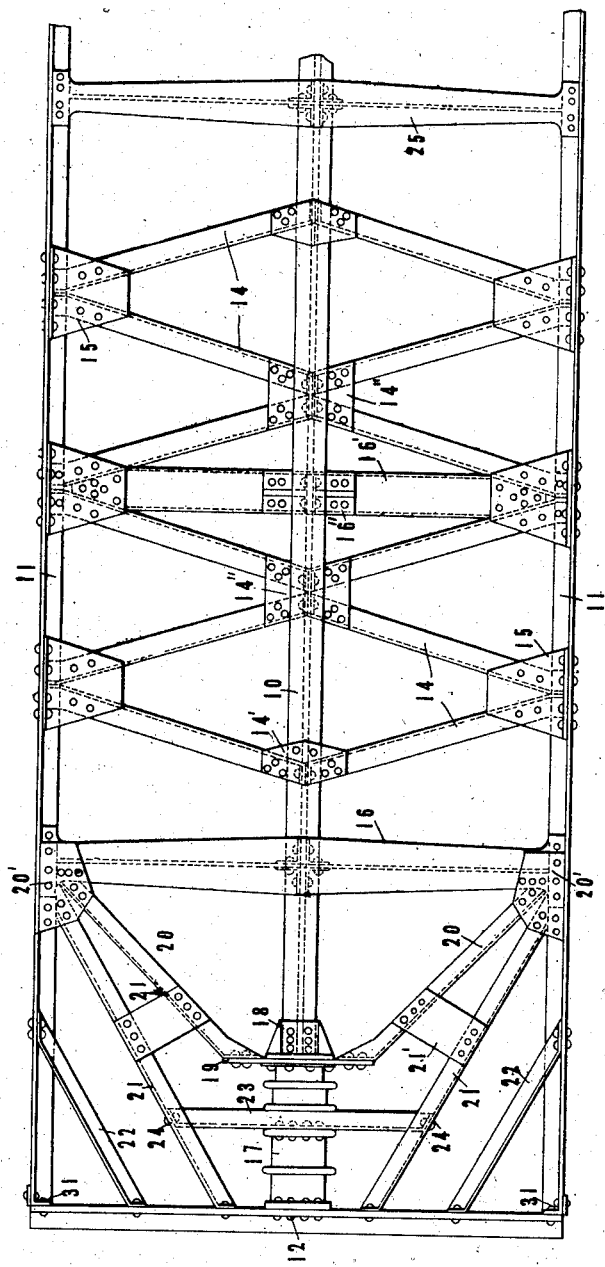

In the drawings—Figure 1 is a view of the improved car in side elevation, showing one-half in full and one-half in dotted lines the positions of the several members composing the car structure. Fig. 2 is a view of the improved car, one-half being in end elevation and one-half being in vertical section taken upon the center line of the car. Fig. 3 is a top plan view of the center beam and side sills, together with the braces and the means for adjustment to and connection with the bolsters and transverse beam beneath the center of the car. Fig. 4 is a top plan view of one of the transverse beams for supporting the metal floor, the said floor being broken away to show the beam in full lines. Fig. 5 is a view in elevation of one of the transverse beams for supporting the metal floor, the said floor and the frame of the car being shown in section. Fig. 6 is a transverse sectional view of the supporting beam shown in Fig. 5 and taken on line 6—6. Fig. 7 is a transverse sectional view showing a beam arranged for supporting the center of one of the plates forming the floor of the car and the plate for supporting the beam from the frame braces of the car. Fig. 8 is a longitudinal sectional view showing a modified form of transverse beam for supporting the metal floor. Fig. 9 is a view in side elevation of the modified form of beam shown at Fig. 8. Fig. 10 is a detail sectional view at the transverse center of car and showing in section the arched door-frame, arched truss-member, side plate at eaves of car, the gusset for connecting and tying the several parts together and also shows the end of one of the carlines and the method of turning down the roof-sheets at eaves of car. Fig. 11 is a detail sectional view showing the carlines and the manner of attaching the roof-plate thereto.

Like characters of reference designate corresponding parts throughout the several views.

The car structure forming the subject-matter of this application comprises a center beam 10 of any approved form, but preferably, as here shown, comprising a single I-beam extending longitudinally of and throughout the greater portion of the length of the car, but stopping short of the ends, as shown particularly in Figs. 1 and 3.

Associated with the center I-beam 10 of the car are the side sills 11, extending longitudinally of the car and parallel with the central beam 10 and defining the limits of the structure. The side sills 11 are connected and joined at their opposite ends by means of end sills 12, preferably composed of angle iron, as are the side sills, and beneath which are disposed heavier sills 13, preferably composed of channel iron. The side sills and the center beam are rigidly secured together and braced by means of diagonally disposed braces 14, rigidly riveted or otherwise permanently secured to the center I-beam and to gussets 15, which are rigidly secured to the vertical and horizontal flanges of the side sills 11. The side sills 11 are also supported upon the bolsters 16, which said bolsters are rigidly connected at right angles to the I-beam 10.

The side sills 11 and the center sill I-beam 10 are rigidly secured together and braced by means of obliquely-disposed braces 14, the first two braces inside of the bolster 16 connecting to the center I-beam 10 through their vertical flanges after same have been set at an angle to the main body of the brace, the said angling to form a foot of the brace and the foot of each of the two braces to be rigidly riveted together through the vertical web of center sill I-beam 10, and the said inner ends of these braces are further secured to a suitable gusset-plate 14', as shown, by being rigidly riveted, and the said gusset-plates are turned up and rigidly riveted to the vertical web of the center sill I-beam 10, the two said braces 14 running obliquely away from the body-bolster 16 and from the center I-beam 10 and connecting at the said side sill by said means each with one other brace 14 of the same kind, as shown particularly in Fig. 3, and these two connecting-braces 14 run back to the center sill I-beam 10, but oppositely inclined to the first braces, and the last said braces meet two other diagonal braces, as shown, which diagonal braces in turn run diagonally back to the said side sill and meet two other diagonal braces, and so on throughout the distance between the two bolsters or between bolster and center needle-beam.

Where two of the braces meet at the side sill their vertical flanges are angled at right angles to the side sill, and these vertical flanges become adjacent and are rigidly riveted together in the manner shown, while the horizontal flanges are rigidly riveted to and through the bottom flange of side sill 11 and through suitable gusset-plate 15, resting on the top side of bottom flange of side sill, which gusset-plates 15 turn up and are riveted to the vertical flange of side sill 11, and said gusset-plate 15 also projects horizontally beyond the bottom flange of side sill and is rigidly riveted to the top flanges of the two ingoing diagonal braces, all as shown.

When two of the ingoing diagonal braces 14 meet at the center sill I-beam 10, two other like braces 14 meet on the opposite side of center sill I-beam 10, and all four have their vertical flanges angled to form feet, the foot of one brace to oppose and brace the foot of the corresponding opposite brace, and the two feet of the two corresponding braces are riveted against and through the vertical web of center sill I-beam 10, and the two other corresponding braces are also adjacent and are riveted to the vertical web of center sill I-beam. Furthermore, the four braces running together, two on each side of center sill I-beam and connecting to the center sill I-beam, are also jointly and rigidly secured to each other and to the vertical web of center sill I-beam by means of suitable gusset-plates 14'', each lying horizontally on the top flanges of the ends of the two diagonal braces and rigidly secured to same, and said gussets 14'' also being flanged upward on the vertical web of the center sill I-beam, and said upward-flanged portions rigidly riveted together through the vertical web of center sill I-beam. The side sill 11 and center sill 10, diagonal connecting braces 14, which are joined together or connected by suitable gussets 14'' and 15, will at suitable intervals, as shown, have connected to said gusset 15 at side sill of car a continuous and depressed member 16', preferably channel-iron or T shape, extending from said side gusset 15 to said side gusset 15 on opposite side of car, and said continuous and depressed member 16 passing immediately under the bottom flange of center sill beam 10 and bearing against said flange with its own flanges downward and being connected at its outer end to the said side gussets 15 and at its center to the vertical web of center sill I-beam by means of two brackets 16'' of suitable material and preferably of T shape and said brackets to be riveted through their vertical flanges and through the vertical web of center sill I-beam and to branch off from said I-beam at a point immediately below the said rivets and to have their lower extremities or flanges meet and be rigidly secured to the said depressed support 16' and at points equidistant from center I-beam and rigidly riveted to the depressed support to form a brace and support for the center sill I-beam and to assist the center sill I-beam to support and carry the load superimposed on the center sill I-beam and to assist in transmitting a portion of this load to the side sills 11 of car through the center sill I-beam 10 and depressed support 16'.

At its ends the I-beam 10 is continued by means of a barrel 17, forming a part of a draft-rigging. For such an association the ends of the I-beam 10 are provided with tapered brackets 18, with the plate 19 disposed between the end of the I-beam and the adjacent end of the barrel 17. To the ends of the plate 19 extended beyond the barrel 17 are secured braces 20, extending in inversely-inclined relation to the ends of the bolsters 16, to which they are secured by gussets 20. Other inclined braces, as 21 and 22, are also employed for the purpose of stiffening the structure, and a supporting-beam 23 is preferably connected to the brace-beams 22, as by the rivets 24, and curved downwardly beneath and to support the barrel 17 of the draft-rigging. The braces 20 and 21 are preferably connected and stiffened by a gusset 21', riveted to and spanning the interval between the said braces.

Beneath the center of the car is disposed a transverse needle-beam 25, being wider in the middle and with its ends tapered and formed with a vertically-disposed web and flanges extending upon opposite sides of the web and at right angles thereto, forming at the outer ends substantially a T, as shown in Fig. 1.

At the center of the car is erected a door-frame 28, arched at its upper end and with its lower ends rigidly secured to the sills 11, the said door-frame 28 being integral and preferably formed of channel iron, as shown in section particularly in Figs. 2 and 10.

A truss-bar 29 is secured at its opposite ends to the sills 11 adjacent the bolster 16 and extends in a substantially straight line to adjacent the curvature of the upper portion of the door-frame 28, and is then arched at its middle point to pass over the said door-frame and be secured rigidly by its flange to the upper flange of the channel iron door-frame. The truss-bar 29 is preferably composed of angle iron, with the horizontal flange at its lower side so disposed that the said lower flange (shown at 30 in Figs. 2 and 10) corresponds substantially with and is rigidly secured to the upper flange of the channel-iron door-frame 28.

At the corners of the sills formed by the side sills 11 and end sills 12 are erected corner-posts 31, forming the corners of the car structure, and upon the said corner-posts is secured the ends of the plate 32, which extends longitudinally of the car at the eaves has its vertical flange riveted or otherwise rigidly secured to the vertical flange of the truss-bar 29, as more particularly shown in Figs. 2 and 10. For further strengthening the connected portions represented by the door-frame 28, the truss-bar 29, and the plate 31 a gusset 33 is riveted or otherwise rigidly secured adjacent the top of the door-frame and is provided with a curved cut-out portion conforming substantially to the curvature of the interior opening of the said door-frame and with its upper edge extending upwardly and flanged outwardly, as at 34, and rigidly secured to the plate 32.

The corner-posts 31 are made rigid by having their lower ends extend downwardly beyond the sills 11 and said extended ends engaged by braces 35, which extend in an inclined position and are secured to the sills 11 through their horizontal flanges. The braces 35 are further strengthened by gussets 36' to prevent buckling. The side plates 32 are connected at their ends by a transversely-disposed end plate 37 with its flange turned inwardly and the structure made rigid by means of a plurality of inclined braces 38, secured at their lower ends to the sills 11 and 12 and at their upper ends to the side and end plates and to gusset 33 and to other gussets 39, secured to the plates 32. A brace 38$^a$ is also secured at the juncture of the truss-bar and door-frame and extends obliquely downwardly and is secured to the side sill, whereby the structure formed by the door-frame and truss-bar is strengthened and the sill supported and made more rigid.

The sides and ends of the car are composed of metal sheets, as 40, rigidly riveted to the corner-posts 31 and to the door-frame 28, and the intervening seams, as at 41, riveted each to the other and to the frame-posts 42, disposed vertically above the bolster 16. The side sheets 40 are riveted securely to all of the transverse braces 38 and to the several vertical posts, whereby the plates are prevented from buckling under the action of expansion or load.

Extending transversely of the structure at properly-spaced intervals are channel iron beams 43, supported upon brackets, as 44, secured to the sills 11, and other brackets, as 45, secured to the central I-beam 10. The beams 43 are riveted or otherwise secured to the I-beam 10 by turning a portion of the web, as 46, and to the sills 11 by turning the end of the flange, as 47, at right angles to the beam, the remaining portion of the beam being cut away to correspond in length to the interval between the sills 11 and I-beam 10. At those places where the sheets 46 of the floor join the said beams 43 are used in pairs, as shown particularly in Figs. 4 and 6, and with the edges 48 of the floor material bent downwardly and clamped between the channel irons 43, as by the rivets 49, inserted through the said channel irons and through the clamped edges of the plate. The edges of the plates 46 at the side of the car are turned upwardly at 50 and riveted through the plates 40. For supporting the plates 48 intermediate the double bars 43 a single bar 51 is employed with its web turned, as at 52, for engagement with the sills 11, and as the said beam 51 is single it is preferably supported by means of the plate 53 or other similar bracing means rigidly secured at its upper end to said beam and at its lower end to any convenient brace 14 and given the necessary twist to compensate for the obliquity of the brace 14.

As shown in Fig. 8, the channel iron beams 43' may be connected with the sills 11 by employing a short piece of T-iron 54, having its web portion 55 extending outwardly from the sill 11 and with the beams 43' curved at their extremities, as at 56, to embrace the web 55 of the T-iron and secured thereto in any approved manner, as by the rivets 57.

To permit the use of a draw-bar in connection with the structure shown, the channel iron beam 13 at the end of the car is provided with an opening 58, proportioned to permit the insertion of a yoke of a coupler of the usual form. To strengthen the beam 13, an angle iron 59 is rigidly secured to the under side of the said beam and, spanning the opening 58, is rigidly secured to the lower flange of the said beam 13.

The roof of the car structure is formed by a plurality of T-beams or carlines 60, forming an arch or segment of a circle and connected at their extremities to the plates 32 by means of gussets 60' or otherwise. The supporting beams or carlines at the ends of the car are preferably constructed of angle iron, as shown at 61, curved to correspond with the T-beams 60 and similarly secured at their ends. The T-beams or carlines 60 are preferably so spaced that the sheets of the material forming the roof of the car cover an interval equal to the space between two of said carlines and with sufficient material to form the connections with the said carlines hereinafter described. The carlines are tied by means of angle iron braces 62, extending transversely of the car, and with a short brace, as 63, disposed centrally of the carlines with its upper end turned, as at 64, and secured to the said carlines and lower ends turned, as at 65, and connected to the tie 62. The sheets of material 66, forming the outer surface of the ends of the car, extend upwardly to the transverse plate 37, and a plate 67 is secured to the end carline 61 and extends downwardly and overlaps the upper edge of the plates 66, as shown particularly in Figs. 2 and 11. A plate of material 68 is provided at its longitudinal edges with upturned flanges 69, proportioned to fit between the carline 61 and the adjacent carline 60, and a cap 70 is disposed over the upturned flange 69 and the upper curved edge of the plate 67 and is secured to said edges and through the carline 61, as by the bolt 71, the plate 67 being secured by a rivet countersunk in the carline 61. A second plate 72 is provided at its longitudinal edges with upturned flanges 73 and at its longitudinal center with an upwardly-extending curved portion 74, proportioned to fit over the carline 60, disposed to receive the same, with the upturned edge 73 disposed opposite the edge 69 and with the cap 75 disposed over the upturned edges 69 and 73 and secured by rivets or bolts 76. The curved portion 74 is also secured to the carline 60, as by bolts or rivets 77, whereby the plates 68 and 72 are easily removed from the roof structure. The outer edges forming the ends of the plates, as 68 and 72, are curved downwardly, as at 78, over the plate 32, as shown in detail in Fig. 10.

For supporting the center of the car, brackets or queen-posts are secured beneath the sills 11, with upright portions 79 beneath the side posts of the door-frame 28 and with inclined portions 80 extending and secured to the center needle-beam 25 by means of reduced portions, as 81, being inserted and secured between the upper and lower flanges of the said needle-beam. A truss-rod 82 is secured to the bolster 16 and, extending beneath the queen-posts 79, is provided with collars or nuts 83, bearing against the outer surfaces of the posts and with the turnbuckle 84 for exerting strain upon the said truss-rod. As the truss-rod 82 is tightened by means of the turnbuckle 84, the upright portions 79 of the queen-posts are lifted and are also forced toward each other, so that the ends of the inclined portions 80, connected with the center needle-beam 25, are also raised to support the said beam and the central portions of the car. The queen-posts are provided at their lower ends with recesses 85 to receive and accommodate the truss-rods 82, which said rods are retained therein by means of bolts or pins 86 and with horizontal portions 87, extending longitudinally of the car beneath the door-openings and terminating in the reduced ends 81, secured to the needle-beam, as above described, and with the inclined portions 80 forming a supporting arch for the center of the car structure.

Certain features herein shown and described are shown, described and claimed in my copending applications Serial Nos. 277,912 and 352,725, respectively filed September 11, 1905, and January 17, 1907.

Having described my invention, what I claim as new and desire to secure by Letters Patent is:

1. In a car structure, side sills, a door-frame rigidly secured to a side sill and comprising an integral structure embodying an arched top and vertical side posts, and a truss-bar rigidly secured at its opposite ends to the sill and curved over and rigidly secured to the arched portion of the door-frame.

2. In a car structure, side sills, a door-frame secured to the sills and comprising vertical side posts and an integral upper curved portion, a plate secured at the upper portion of the door-frame, and a gusset rigidly connecting the door-frame and plate.

3. In a car structure, side sills, bolsters supporting said side sills, a door-frame disposed centrally between the bolsters and comprising side posts, and an integral arched top portion and braces extending from the bolsters and secured to the upper arched portion of the door-frame.

4. In a car structure, side sills, a draft-rigging disposed intermediate the sills and braces connecting the sills, and the draft-rigging intermediate its ends and forming an arch.

5. In a car structure, a single central supporting-beam, side sills spaced upon opposite sides of the central beam, means connecting the side sills and central beam rigidly together, and an arched door-frame rigidly secured centrally of the side sills.

6. In a car structure, a door-frame comprising spaced side posts, bolsters disposed beneath the car structure adjacent the opposite ends, and a truss-bar rigidly secured to the structure adjacent the bolsters and extending to and arched over the door-frame.

7. In a car structure, a door-frame disposed centrally of the longitudinal side of the structure, bolsters secured rigidly beneath and adjacent the opposite ends of the structure, truss-bars rigidly secured to the structure adjacent the bolsters, and inclined reversely upward toward the middle of the car and extending to and arched over the door-frame.

8. In a car structure, side sills, an end sill connecting the side sills, a draft-rigging secured to the end sill and disposed intermediate the side sills, and braces connecting the side sills and draft-rigging intermediate its ends and forming an arch.

9. In a car structure, side sills, an end sill connecting the side sills, a bolster connecting and rigidly secured at opposite ends to the side sills, a draft-rigging secured to the end sill, and braces connecting the side sills and draft-rigging and forming an arch from the ends of the bolster to the draft-rigging intermediate its ends.

10. In a car structure, side sills, an end sill, inclined braces extending from the side sills adjacent the center of and connected with the end sill, a draft-rigging disposed between the braces, and means carried by the braces and arranged to support the draft-rigging.

11. In a car structure, a single center beam, a bolster comprising a central web surrounded by a flanged portion disposed at right angles to the central web and with a central opening formed in the web and proportioned to receive and accommodate the central beam, and with the beam and bolster disposed perpendicularly to each other, and angle-braces rigidly secured to the beam and bolster within the angles formed at their juncture.

12. In a car structure, a single central beam, sills in parallelism with and spaced from the central beam, and upon opposite sides thereof, a bolster provided with a central opening proportioned to receive and accommodate the central beam, means rigidly securing the spaced sills and the opposite extremities of the bolster, and angle-braces rigidly secured to the bolster and central beam, and disposed within the angles formed at their juncture.

13. In a car structure, side sills, an end sill, a bolster disposed transversely of the structure and rigidly connected at opposite ends to the side sills, inclined braces extending from adjacent the bolster to and rigidly connected with the end sill adjacent its middle and forming an arch, a draft-rigging connected to the end sill and disposed between the arched braces and other inclined braces extending from adjacent the bolster to and connected with the draft-rigging intermediate its ends and forming an arch.

14. In a car structure, a single central beam, side sills spaced upon opposite sides of the beam, means rigidly bracing the side sills and central beam relative to each other, a draft-rigging secured to the end of the central beam and extending to the end of the structure, and means passing beneath and to support the draft-rigging carried by the sill-bracing means.

15. In a car structure, a single central beam extending longitudinally of the car, side sills spaced upon opposite sides of the central beam, braces rigidly secured to the central beam and extending obliquely to and rigidly secured upon the side sills, a draft-rigging rigidly secured to the end of the central beam and extending to the end of the structure, and a supporting-brace disposed beneath the draft-rigging and with its opposite ends rigidly secured to the oblique braces.

16. In a car structure, spaced side sills, door-frames rigidly secured to the side sills and comprising spaced side posts, and integral-arched top portions defining registering door-openings upon opposite sides of the structure, truss-bars rigidly secured to the sills adjacent their opposite ends and extending to and arched over the arched door-frames, and with the arched portions of the truss-bar and door-frame rigidly secured together, corner-posts erected at the extremities of the side sills, and plates rigidly secured to the upper extremities of the corner-posts and extending longitudinally of the structure and rigidly secured at their middle points to the arched door-frame and arched truss-bar.

17. In a car structure, side sills, an end sill, a bolster disposed transversely of the structure and rigidly connected at opposite ends to the side sill, inclined braces extending from adjacent the bolster to and rigidly connected with the end sill adjacent its middle and forming an arch, a draft-rigging disposed between the braces, and means carried by the braces and extending beneath and to support the draft-rigging.

18. In a car structure, side sills, an end sill, a bolster disposed transversely of the structure and rigidly connected at opposite ends to the side sills, inclined braces extending from adjacent the bolster to and rigidly connected with the end sill adjacent its middle, and forming an arch, a draft-rigging disposed between the braces, means carried by the braces extending beneath and to support the draft-rigging, and inclined braces extending from adjacent the ends of the bolster to and rigidly connected with the draft-rigging and forming an arch.

19. In a car structure, side sills, an end sill, a bolster disposed transversely of the structure and rigidly connected at opposite ends to the side sills, inclined braces extending from adjacent the bolster to and rigidly connected with the end sill adjacent its middle, and forming an arch, a draft-rigging disposed between the braces, means carried by the braces and extending beneath and to support the draft-rigging, inclined braces extending adjacent the end of the bolster to and rigidly connected with the draft-rigging and forming an arch, and gussets joining the two sets of inclined braces intermediate their ends.

20. In a car structure, a side sill, a side plate, an arched door-frame erected between the sill and plate and rigidly secured to each, a truss-bar arched over the top of the door-frame and having its opposite ends rigidly connected with the sills, and braces extending between the plate and the truss-bar intermediate the door-frame and its ends.

21. In a car structure, a side sill, a side plate, an arched door-frame erected between the sill and plate, a truss-bar arched over the top of the door-frame and with its opposite ends rigidly secured to the sill, and a brace extending from the plate to the truss-bar, intermediate the door-frame and one end, and disposed substantially at right angles to the truss-bar.

22. In a car structure, a side sill, a side plate, an arched door-frame erected between the sill and plate, a truss-bar arched over the door-frame and rigidly secured at its opposite ends to the sill, a brace extending from the plate to the truss-bar intermediate the door-frame and one end, and disposed substantially at right angles to the truss-bar, and a brace extending from the sill to the truss-bar, and disposed substantially at right angles to the truss-bar.

23. In a car structure, a side sill, a side plate, an arched door-frame erected between the sill and plate, a truss-bar arched over the door-frame and having its opposite ends rigidly secured to the sill, and braces rigidly secured to the sill and inclined toward and extending to the juncture of the door-frame and truss-bar.

24. In a car structure, a side sill, a side plate, a door-frame erected between the sill and plate, a truss-bar arched above and rigidly secured to the door-frame and plate, and with its opposite ends rigidly secured to the sill, and brace-bars rigidly secured to the sill between the door-frame and the ends of the truss-bar and extending in an inclined position to and rigidly secured at the junctures of the truss-bar and door-frame.

25. In a car structure, a side sill, a side plate, an arched door-frame erected between the sill and plate and rigidly connected with each, a truss-bar arched above and rigidly secured to the door-frame and having its opposite ends rigidly secured to the sill, and a plurality of braces extending from the plate to and substantially at right angles with the truss-bar.

26. In a car structure, a side sill, a side plate, an arched door-frame erected between the side plate and the side sill and rigidly secured to each, a truss-bar arched above and rigidly secured to the door-frame and with its opposite ends secured to the sill, and a plurality of braces extending from the sill to and at right angles with the truss-bar.

27. In a car structure, a side sill, a side plate, a door-frame erected between the sill and plate, a truss-bar arched above the door-frame and rigidly secured thereto and with its opposite ends rigidly secured to the sill, a plurality of braces extending from the plate to and at right angles with the truss-bar, and other braces extending from the sill to and at right angles with the truss-bar.

28. In a car structure, a side sill, a side plate, a door-frame erected between the sill and plate, a truss-bar arched above the door-frame and rigidly secured thereto and to the plate, and with its opposite ends secured to the sill, reversely-inclined braces secured to the sill between the door-frame and the ends of the truss-bar, and extending to and secured at the junctures of the truss-bar and door-frame.

29. In a car structure, a side sill, a side plate, a door-frame erected between the sill and plate, and rigidly secured to each, a truss-bar arched above the door-frame and rigidly secured thereto and to the plate, and with its opposite ends rigidly secured to the sill, reversely-inclined braces secured to the sill between the door-frame and the ends of the truss-bar and extending to and secured at the junctures of the truss-bar and door-frame, and a brace extending from the plate to the truss-bar and disposed substantially at right angles to the truss-bar.

30. In a car structure, a side sill, a side plate, a door-frame erected between the sill and the plate, and rigidly secured to each, a truss-bar arched above the door-frame and rigidly secured thereto, and to the plate, and with its opposite ends rigidly secured to the sill, reversely-inclined braces rigidly secured to the sill between the door-frame and the ends of the truss-bar, and extending to and rigidly secured at the junctures of the truss-bar and door-frame, braces extending from the plate to the truss-bar and rigidly secured at right angles thereto, and other braces extending from the sill to the truss-bar and rigidly secured at right angles thereto.

31. In a car structure, spaced bolsters, a side sill carried upon the bolsters, a side plate spaced above the side sill, a door-frame erected between the sill and the plate and intermediate the bolsters, a truss-bar arched above the door-frame and rigidly secured thereto and to the plate, and with its ends secured rigidly to the side sills adjacent the bolsters, reversely-inclined braces extending from the side sill intermediate the door-frame and bolsters to and secured at the junctures of the door-frame and truss-bar, braces extending from the plate to and rigidly secured at right angles to the truss-bar, and other braces extending from the sill and rigidly secured at right angles to the truss-bar.

In testimony whereof I affix my signature, in the presence of two witnesses.

WILLIAM R. McKEEN, Jr.

Witnesses:
   Chas. L. Dundey,
   H. R. Van Arsdale.